3,268,492
TERPOLYMER
John R. Costanza, North Plainfield, Elmer E. Waters, Westfield, and Sorrell Roth, Irvington, N.J., assignors to Celanese Corporation of America, New York, N.Y., a corporation of Delaware
No Drawing. Filed June 12, 1962, Ser. No. 201,781
4 Claims. (Cl. 260—78.5)

This invention relates a novel thermosetting terpolymer. It more particularly refers to such a terpolymer which is heat curable without the necessity of additional modifying agents.

A terpolymer of trimethylolpropane monoallyl ether, an acrylic ester, preferably 2-ethyl hexylacrylate and maleic anhydride is prepared according to this invention. This terpolymer has the unusual property of being heat curable per se without the addition of further hardening or crosslinking agents. A terpolymer according to this invention is soluble in dilute alkaline solutions, e.g. sodium, potassium, and ammonium compound solutions, and can be cast into a film from such solutions. Films of such terpolymers are thermosetting, glossy, clear, hard and flexible. Further the heat stability, flame resistance and solvent resistance of such terpolymer films are superior to conventional epoxy, urethane, vinyl, acrylic, polyester and melamine-acrylic coatings.

Polymers according to this invention can be prepared by dissolving about 30 to 70 parts by weight, preferably 40 to 50, of a monomer mixture in an appropriate solvent with a free radical catalyst e.g. peroxide or azo compound. Catalyst concentration is suitably about 0.1 to 10%, preferably 1 to 3%.

Solvent resistance was tested by exposing the various films for equal times to carbon tetrachloride, benzene, acetone, ethyl acetate, water, 2% solution of Tide detergent and 1% sulfuric acid solution. The heat resistance was tested by subjecting the various films of 150° C. for 1, 4 and 24 hours and noting the color build up in each film. Flame resistance is determined by measuring the film degradation caused by a burning match on the film surface.

*Example*

A terpolymer in accord with the invention was prepared by dissolving 12 parts by weight of a 1 to 1 to 1 mole ratio charge of trimethylolpropane monoallyl ether, maleic anhydride and 2-ethyl hexyl acrylate in dioxane. The solution was heated to 80° C. whereupon the exothermic reaction carried the temperature to about 90 to 107° C. The reaction was maintained at this temperature by incremental addition over 2 hour period of 33 parts by weight more of termonomer charge in the same mole ratio. The reaction proceeded for 1.5 hours and yielded a 94% conversion of monomers to polymer at 60% solids concentration. After reflux reaction for about 3 to 8 hours 100% yields are obtained.

Solvent cast films of the instant terpolymer are curable at room temperature to a tack free condition after about 70 hours. It is within the scope of this invention to accelerate film curing and hardening by either raising the temperature and/or using a catalyst. A curing catalyst of 2% boron trifluoride-acetic acid complex reduced the room temperature curing time to 48 hours; a 2% p-toluene sulfonic acid catalyst reduced curing time at room temperature to 36 hours. Elevated temperatures, e.g. 150° C. can cut the curing time in half.

The polymer of this invention has additional utility as a waterproofing, crease proofing or weighting agent for textiles, particularly fabrics. In this application, the textile is treated with a solution of the terpolymer, e.g. a dilute alkaline solution, to impregnate the textile with the soluble polymer salt, and then the impregnated textile is treated with alum or a similar material to form an insoluble salt of the polymer in the textile. The thus modified textile is thereby rendered resistant to loss of polymer through repeated laundering.

It is to be understood that the foregoing detailed description is given merely by way of illustration and that many variations may be made therein without departing from the spirit of our invention.

Having described our invention what we desire to secure by Letters Patent is:

1. A thermosetting terpolymer of a mono allyl ether of trimethylolpropane 2-ethyl hexyl acrylate and maleic anhydride in the ratio of 1 to1 to 1.

2. A thermosetting film of a terpolymer of a mono allyl ether of trimethylolpropane, 2-ethyl hexyl acrylate and maleic anhydride in the ratio of 1 to 1 to 1.

3. A textile having impregnated therein an insoluble alum salt of the terpolymer claimed in claim 1.

4. An alum salt of the thermosetting terpolymer, a mono allyl ether of trimethylolpropane, 2-ethyl hexyl acrylate and maleic anhydride in the ratio of 1 to 1 to 1 dissolved in dilute alkaline solution.

References Cited by the Examiner
UNITED STATES PATENTS

| | | | |
|---|---|---|---|
| 2,798,053 | 7/1957 | Brown | 260—78 |
| 2,854,486 | 9/1958 | McShane | 260—614 |

JOSEPH L. SCHOFER, *Primary Examiner.*
LEON J. BERCOVITZ, *Examiner.*
L. WOLF, *Assistant Examiner.*